Oct. 20, 1936.  S. S. SPIRE  2,057,854
HARROW
Filed July 1, 1935  3 Sheets-Sheet 1
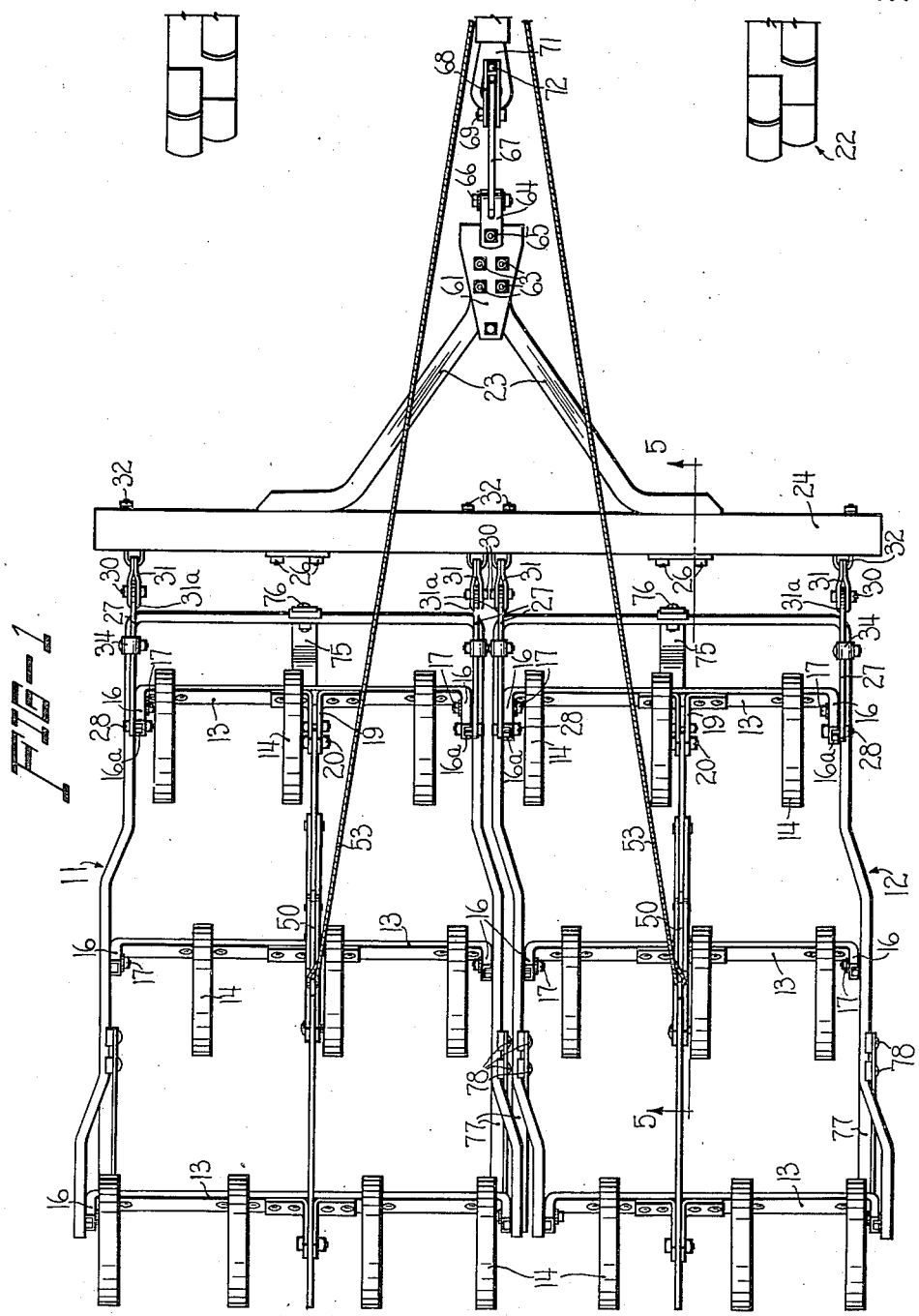
INVENTOR
Sheldon S. Spire
BY
Brown, Jackson, Boettcher & Dienner
ATTORNEYS.

Oct. 20, 1936.  S. S. SPIRE  2,057,854
HARROW
Filed July 1, 1935  3 Sheets-Sheet 2
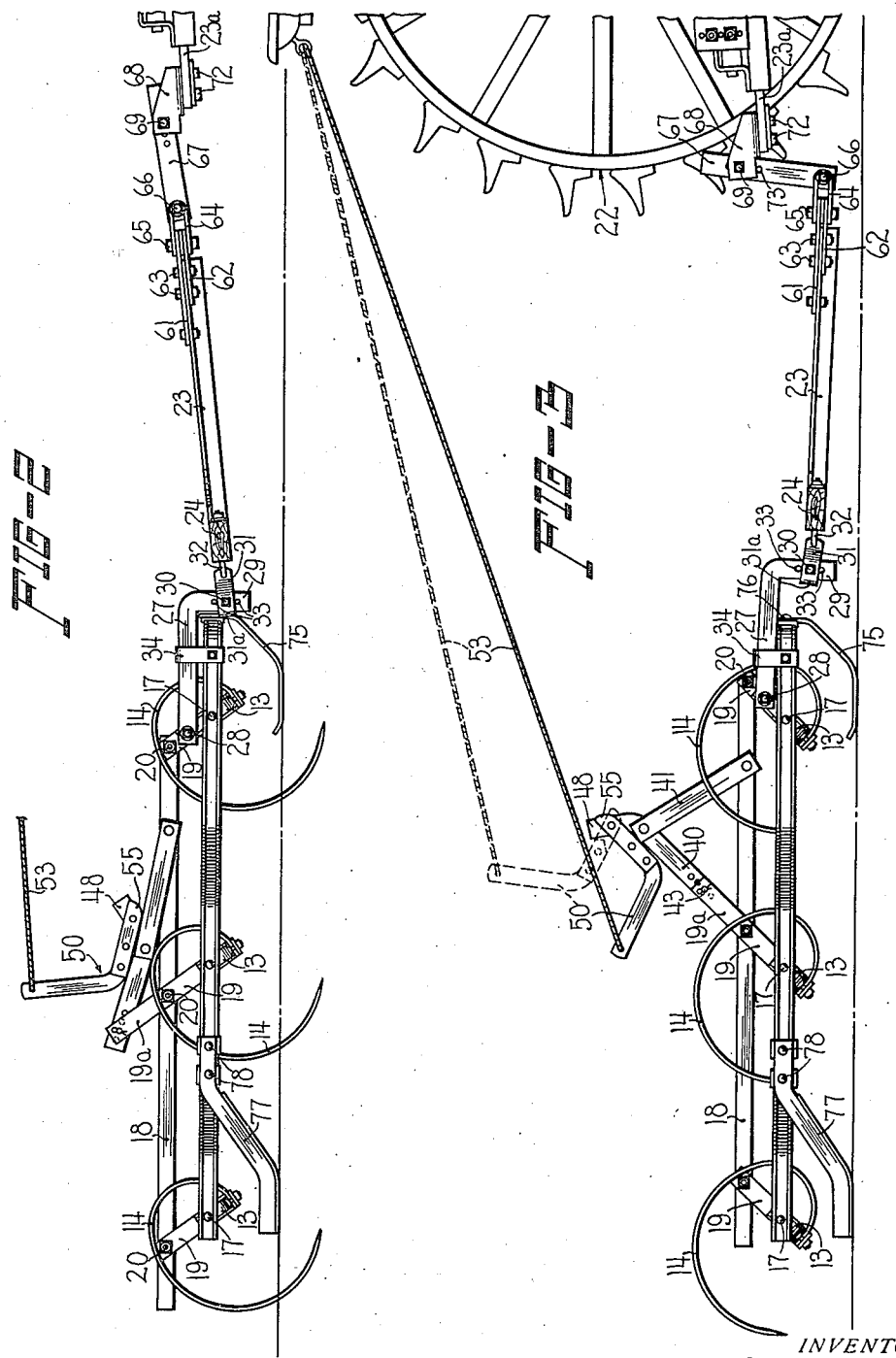
INVENTOR
Sheldon S. Spire
BY
Brown, Jackson, Boettcher & Dienner
ATTORNEYS.

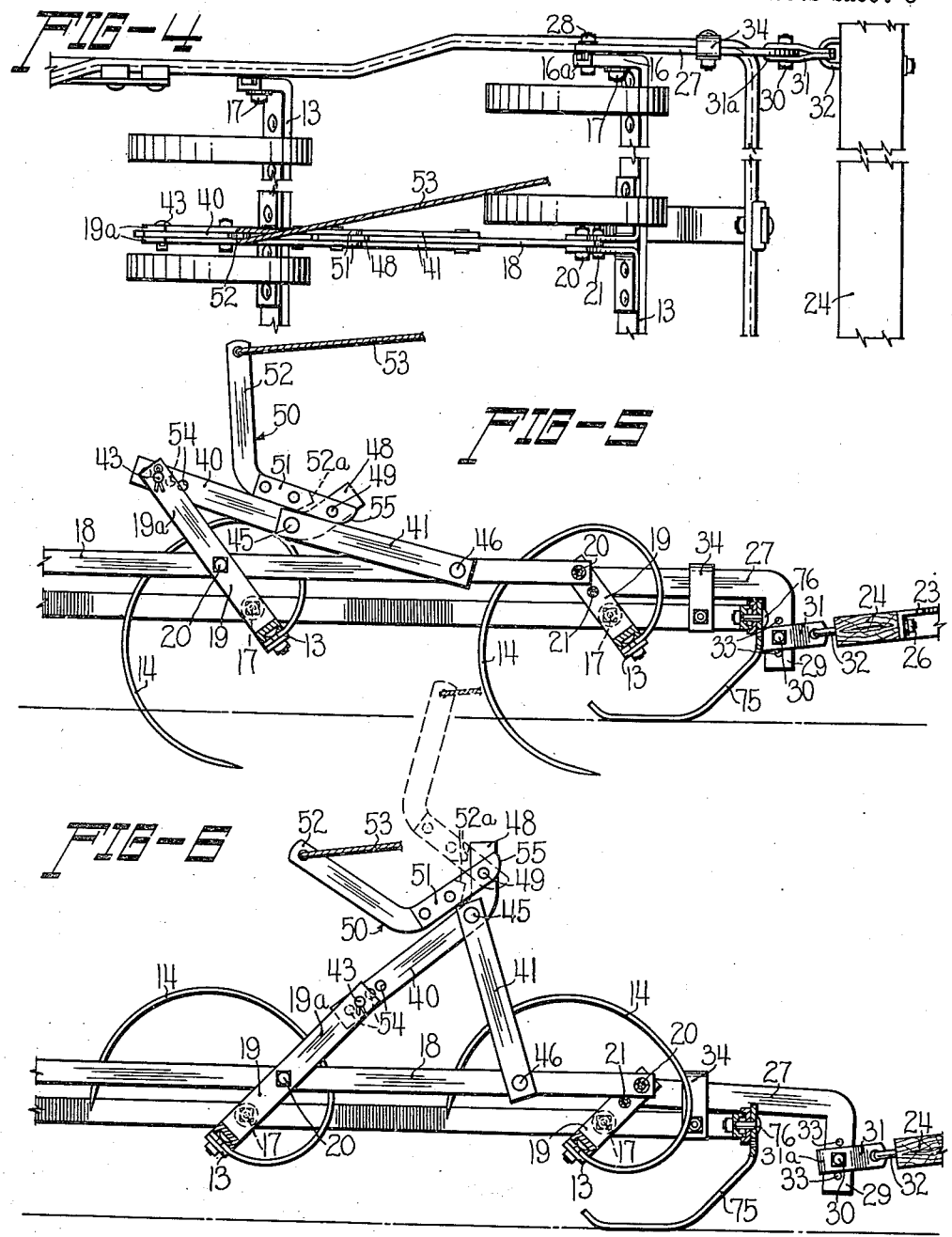

Patented Oct. 20, 1936

2,057,854

UNITED STATES PATENT OFFICE 2,057,854

HARROW

Sheldon S. Spire, Syracuse, N. Y., assignor to Syracuse Chilled Plow Co., Inc., Syracuse, N. Y., a corporation of New York Application July 1, 1935, Serial No. 29,187

22 Claims. (Cl. 55—104)

The present invention relates to improvements in tillage implements of the type adapted to be drawn by a tractor or other propelling means, and more particularly to that class of implements generally known as spring tooth harrows. A harrow of this general type is illustrated and described in Patent No. 1,913,039, to Willam L. Paul, dated June 6, 1933, and the principal object of the construction illustrated and described herein is to provide certain improvements upon the structure disclosed in said patent.

Another object of the invention is to provide new and improved means for applying draft force to the harrow sections whereby such sections will run in a straight line without danger of swinging or slewing sideways, thus obviating the necessity of connecting the sections together along their adjacent side edges to hold them in proper spaced position relative to each other.

A further object of the invention is to provide certain improvements in the means for connecting the harrow sections to the propelling means whereby the main frame of each section may be made lighter in weight, thereby materially lessening the cost of manufacture thereof.

Other objects and advantageous features will appear from the following description of the preferred embodiment of my invention illustrated in the accompanying drawings and hereinafter described.

In the drawings:

Figure 1 is a top plan view of a two-section spring tooth harrow equipped with my improved mechanism, the teeth of the harrow being shown in operating position, and also illustrating portions of the rear traction wheels of the drawing tractor to which the harrow is attached;

Figure 2 is a side elevational view illustrating the positions of the various parts of the operating mechanism when the harrow teeth are in operating position;

Figure 3 is a view similar to Figure 2, but showing the parts of the harrow when in transport position;

Figure 4 is an enlarged top plan view of the shifting mechanism at the left hand side of the harrow as viewed from the front thereof, and illustrating the parts of the harrow when in operating position;

Figure 5 is a fragmentary enlarged longitudinal vertical sectional view taken substantially on the plane of the line 5—5 of Figure 1 with the parts of the shifting mechanism in the positions they assume when the harrow teeth are in operating position; and Figure 6 is a view similar to Figure 5 with the parts in the positions they assume when the harrow teeth are in transport position.

While in the drawings I have shown my invention as applied to a two-section spring tooth harrow, it should be understood that the invention is not limited to use with a harrow of two sections, as it is adapted for use with one having any number of sections. It is also to be understood that certain features of my invention are adapted for use with types of implements other than harrows provided with spring teeth, and the appended claims are therefore to be construed accordingly.

Referring to the drawings, as shown in Figure 1 the harrow comprises two substantially parallel approximately U-shaped frame sections or members 11 and 12 formed of channel iron. Extending transversely of each of the frame sections 11 and 12 are a plurality of tooth carrying bars 13 of any approved type, and on each of said bars are mounted a plurality of the usual spring teeth 14. In the illustrated construction each of the frame sections is provided with three tooth carrying bars, but it is to be understood that any desired number of such bars may be employed. The opposite ends 16 of the tooth carrying bars 13 are bent laterally relatively to the main body portion thereof and pivotally connected directly to the side members of the frame sections 11 and 12 by transversely extending pivot bolts 17, as best shown in Figure 1, whereby said bars 13 have a fore and aft rocking movement with respect to the frame to raise and lower the harrow teeth. By rocking the bars 13 either forwardly or rearwardly, the teeth 14 carried by these bars are rocked to their transport position as shown in Figures 3 and 6, or to their working position as shown in Figures 2 and 5. As best shown in Figures 1 and 4, the laterally turned ends 16 of the front tooth carrying bar 13 of each harrow section are extended upwardly some distance above the side members of the frame sections 11 and 12 as indicated at 16a for a purpose which will be hereinafter described.

The several tooth carrying bars 13 of each frame section are operatively connected to a longitudinally extending shifting bar or lever 18 by suitable standards 19 extending upwardly from said bars about midway of their length, said standards being rigidly connected to the tooth carrying bars and pivotally connected to the shifting bar or lever as shown at 20, as is conventional in machines of this type. A stop 21 in the form of a suitable bolt or pin is carried by each of the front standards 19, said stop cooperating with the associated shifting bar to limit the forward movement of said bar in the operation of raising the teeth 14 to transport position, as will be hereinafter described.

The tractor is indicated as a whole by the reference numeral 22, draft being applied to the harrow from the tractor through a suitable hitch member in the form of a draft frame comprising forwardly converging bars 23, which at their forward ends are suitably pivotally connected to the draw bar 23a of the tractor as hereinafter described, and a transversely extending beam 24 to which the rear ends of the bars 23 are suitably connected by bolts 26 (see Figures 1, 2 and 3).

Draft is applied to each of the frame sections 11 and 12 from the draft frame comprising the members 23 and 24 through the instrumentality of a pair of sliding draft members 27 having their rear ends pivotally connected by pivot bolts or pins 28 to the extended upper ends 16a respectively of the front tooth carrying bar 13 before described. Adjacent its forward end each of the draft members 27 is provided with a downturned portion extending substantially at right angles to the main body portion thereof as indicated at 29 and pivotally connected to said downturned portion by a transversely extending pivot bolt or pin 30 are the rear ends of a pair of clips 31 one of which is disposed on either side of the member 29 as shown. The clips 31 at their rear ends are provided with inwardly turned lips 31a which are adapted to contact with the member 29 to limit the pivotal movement of the clips with respect to said member so that they will not rotate much beyond a horizontal position when backing the implement. It will be understood, however, that if desired a clevis may be employed in lieu of the pair of links 31. The forward ends of the links 31 are pivotally connected to the transverse beam 24 of the draft frame by means of a hook-bolt 32. As shown, a plurality of holes 33 are provided in the downturned portion 29 of each of the draft members 27 to provide for changing the vertical position of the point of hitch between the draft members 27 and the transverse beam 24 of the hitch member when it is deemed desirable.

It will be seen from the above that the transverse beam 24 of the draft frame is supported by the harrow sections through the instrumentality of the sliding draft members 27. By providing a draft member 27 at each side of each harrow section and connecting such draft members to the opposite upturned ends of the transversely extending tooth carrying bar the draft is applied to each section substantially in line with the side frame members of the sections, thus ensuring that they will move forward in substantial parallelism without danger of swinging or slewing sideways, as is the case where the draft is applied only at the center of the front of the frame. Thus, the necessity of providing means for connecting the harrow sections together along their adjacent side margins to hold them properly spaced apart is obviated.

The draft members 27 in the operation of the implement as will be hereinafter described are adapted to be shifted bodily fore and aft relative to the harrow sections, in such shifting movement sliding through U-shaped guide brackets 34 suitably secured to and extending upwardly from the opposite side members of said harrow sections near the forward ends thereof. These guide brackets 34 act to guide the members 27 so that they will move in a substantially straight line in their fore and aft movement in the operation of the implement, and they also prevent the forward ends of the members 27 from swinging upwardly about their rear pivot points 28 upon backing of the tractor to lower the teeth from transport position to operating position as hereinafter described.

The teeth of each harrow section are locked in their lowered or operating position by suitable toggle mechanism comprising links 40 and 41 associated with each of the shifting bars or levers 18 and the extended upper end 19a (Figure 2) of the intermediate standard 19 that connects the shifting bar 18 with the intermediate tooth carrying bar 13. This intermediate standard 19 is in the form of a double bar comprising two parallel spaced members positioned on opposite sides of the shifting bar or lever 18, and the link 40 is in the form of a single bar or member having its rear end pivotally connected between the members of the extended upper end 19a of the standard 19 by means of a pivot pin 43 held in position by a cotter pin as shown. Near its forward end the link 40 is pivotally connected at 45 between the rear ends of the two parallel bars or members that form the link 41. The forward end of the link 41 is pivotally connected at 46 to the shifting bar 18 at a point located between the intermediate and front standards 19. The link 40 adjacent the pivot point 45 is provided with an offset arm 48 to which is pivotally connected at 49 one end of a lever 50 comprising the members 51 and 52. The member 51 of the lever comprises two bars that extend parallel to each other and are positioned on opposite sides of the offset portion 48 of the single bar link 40 and in vertical alignment with the bars of the double bar link 41 above described. The member 52 of the lever comprises a substantially L-shaped bar one arm of which is fixedly secured between the bars of the member 51 at the end thereof opposite the pivot 49 by rivets or in any other suitable manner and lies in vertical alignment with the single bar link 40. To the outer end of the other arm of the L-shaped member 52 of the lever is connected the rear end of a tripping rope or cable 53, the forward end of said rope extending to a point adjacent the driver's seat on the tractor. At this point it may be well to mention that the link 40 is provided with a plurality of holes 54 for receiving the pivot pin or bolt 43 which connects it with the extended upper end 19a of the standard 19, and by transferring said pin to one or the other of said holes the harrow teeth will be set to operate at a different depth, as will be referred to later.

The ends of the bars of the member 51 of the lever adjacent the pivot 49 are formed to provide cam surfaces, indicated by 55, which cam surfaces cooperate with the upper edges of the two bars constituting the link 41 in the operation of breaking the toggle lock by pulling forward on the cable 53 as will be hereinafter described, and the end 52a of the member 52 of the lever that is positioned between the two parallel bars of the member 51 of the lever 50 acts as a stop when the cable 53 is pulled forward to break the toggle lock, such end striking the upper end of the offset member 48 of the link 40 as shown in dotted lines in Figures 3 and 6, thereby preventing the lever 50 from being pulled too far forward by the operator when pulling forward on the cable 53.

Figures 2 and 5 illustrate the positions of the various parts of the toggle mechanism when locked with the teeth 14 in operating position, as with the parts in this position a past center lock is formed by the pivots 43, 45 and 46. With the parts in this last-mentioned position the two bars of the member 51 of the lever and the arm of the member 52 that lies between said bars act to form a stop for limiting the closed position of the toggle, the lower edges of the bars 51 resting on the upper edges of the bars of the double bar link 41 and the lower edge of the member 52 resting on the upper edge of the single bar link 40.

The forward ends of the draft members 23 are rigidly connected together by upper and lower plates 61 and 62, respectively, which are secured together and to the horizontal flanges of the members 23 by means of bolts 63 extending through alined openings in said plates and draft members as shown in Figures 2 and 3. The plates 61 and 62 extend forwardly beyond the forward ends of the draft members 23 and are pivotally connected to the rear end of a clevis 64 by means of a vertically extending pin or pivot bolt 65, the forward end of the clevis being pivotally connected by means of a horizontally extending pivot bolt 66 with the rear end of a draft link 67, the forward end of which is pivotally connected with the rear end of a clevis bracket 68 by means of a horizontally extending pivot bolt 69. The forward end of the clevis bracket 68 is rigidly secured to the draw bar 23a of the tractor by means of bolts 72. As shown in Figure 3, a plurality of holes 73 are provided in the forward end of the draft link 67 for receiving the pivot bolt 69, whereby the point of hitch between the link 67 and the clevis bracket 68 may be adjusted to thereby adjust the height of the forward end of the draft frame above the ground when the parts are in the position shown in this figure, as will be readily understood.

In the present construction the forward end of each of the harrow sections 11 and 12 is supported on a skid or runner 75 having its upper end suitably secured to the front cross bar of the frame section about midway of its length by a bolt 76 and extending downwardly and rearwardly from such point of connection, as shown in Figures 2, 3, 5 and 6. The rear end of each of the two side members or bars of each of the harrow sections 11 and 12 is supported by a skid or runner 77 in the form of an angle iron rigidly secured at its upper end to the side bar adjacent the rear end of the latter by means of a pair of bolts 78, extending downwardly and rearwardly from such point of connection as shown in Figures 2 and 3. These skids are provided so as to raise the frames of the sections above the ground so that the downturned forward ends 29 of the several draft members will clear the ground at all times in their fore and aft movement in the raising and lowering of the teeth.

The operation of my improved mechanism is as follows: When the harrow is in operating position as shown in Figures 2 and 5, the bars of the member 51 of the lever 50 rest on the bars of the link 41 and the arm of the L-shaped member 52 secured between the bars of the member 51 rests on the link 40 as before described, and it will be seen that the pivot points 43, 45 and 46 are on nearly a straight line, with the pivot point 45 slightly below a line drawn through the pivot points 43 and 46. When the draft members 27 are placed under tension by forward pull of the tractor, the toggle links 40 and 41 are placed in compression, which tends to force the pivot point 45 downwardly, but downward movement beyond a predetermined point is prevented by the lower edges of the two bars 51 of the lever 50 and the lower edges of the arm of the lever 52 that lies between such bars coming into contact with the upper edges of the two bars of the link 41 and the lower edge of the arm of the lever 52 that lies between the bars of the link 50 coming into contact with the upper edge of the link 40, as will be readily understood. As a result, forward thrust is applied to the harrow frame through the shifting bar 18 and the links 40 and 41 acting in compression, and as the pivot point 45 is below the plane of a line drawn between the pivot points 43 and 46 as above described, a past center lock is created, which lock can only be released by forcing the pivot point 45 upwardly to a point above the plane of said line, which is accomplished as hereinafter described.

The operating position of the teeth 14 may be adjusted by changing the position of the pivot pin 43 relative to the link 40, and this is accomplished by placing the pivot pin 43 in one or another of the holes 54 provided therefor in the link 40. Placing the pivot pin 43 in the rear hole 54 will cause the teeth to operate deeper, and placing the pin 43 in one of the other holes will cause the teeth to operate more shallow, as will be readily understood.

When it is desired to bring the harrow to transport position from operating position, the operator on the tractor pulls forward on the tripping ropes 53, to swing the levers 50 of the sections on their pivots 49 into a position where the bars of the members 51 of the levers will be moved out of contact with the bars of the links 41, thereby breaking the past center lock formed by the toggle links at each side of the harrow, and as the tractor moves forward the draft members or links 27 will be pulled forwardly. By reason of the pivotal connection of their rear ends with the front tooth carrying bar 13 the latter will be caused to rock forwardly, together with the other tooth carrying bars 13 which are connected with the front tooth carrying bar through the instrumentality of the standards 19 and shifting bar 18. This forward movement of said bars will continue until the stop member 21 carried by the standard 19 of the front tooth carrying bar (see Figures 4, 5 and 6) of each harrow section strikes the lower edge of the shifting bar 18 to thereby prevent further rocking movement of the bars 13, whereupon the harrow may be moved along with its teeth 14 held in transport position.

When it is again desired to move the teeth 14 to lowered or operating position, the tractor is backed to move the sliding draft members 27 rearwardly and thus swing the standards 19 in a counterclockwise direction as viewed in the drawings, thereby moving the toggle links 40 and 41 to their extended position where the pivot points 43, 45 and 46 are in alignment. When in this position the force of gravity acts on the links to swing them downwardly so that the pivot point 45 moves below the line of the pivots 43 and 46, thus establishing the toggle or past center lock so that subsequent forward pull on the draft frame will be effective to draw the implement with the teeth 14 in operating position.

I claim:

1. An agricultural implement comprising a plurality of pivotally supported tool carrying bars, earth working tools carried thereby, a shifting bar operatively connecting said bars for rotating them in unison to move said tools from nonworking position to working position, and toggle link locking mechanism connected with one of said tool carrying bars and said shifting bar for locking said tools in one of said positions.

2. An agricultural implement comprising a plurality of pivotally supported tool carrying bars, earth working tools carried thereby, a shifting bar operatively connecting said bars for rotating the same in unison, a draft member connected with said earth working tools and operative upon backing of the implement to rotate said earth working tools from a transport position to an operating position, and toggle link mechanism connected with said shifting bar and with one of said tool carrying bars for holding said earth working tools in operating position when the implement is propelled forwardly.

3. An agricultural implement comprising a plurality of pivotally supported tool carrying bars, earth working tools carried thereby, a shifting bar operatively connecting said bars for rotating the same in unison, a draft member connected with said earth working tools and operative upon backing of the implement to rotate said earth working tools from transport position to operating position, toggle link mechanism connected between said shifting bar and one of said tool carrying bars for locking said earth working tools in operating position, and means for breaking said toggle lock to permit rotation of said earth working tools from operating position to transport position upon forward movement of said implement.

4. In an agricultural implement, the combination of a plurality of pivoted tool carrying bars, earth working tools carried thereby, a shifting bar operatively connecting said tool carrying bars for rotating said bars in unison, a draft member supported on the forward portion of the implement and controlled by the backing of the implement for lowering said earth working tools from transport position to operating position, and means reacting against said shifting bar for automatically locking said earth working tools in the latter position.

5. In a tractor drawn implement, the combination of a plurality of tool carrying bars pivotally supported on the implement, earth working tools carried thereby, and a draft member slidably supported on the implement, one end of said draft member being pivotally connected directly with one of said tool carrying bars in draft transmitting relation and the other end of said draft member being connected with the tractor whereby said draft member is operative upon backing of the tractor to move said earth working tools from transport position to operating position.

6. In a tractor drawn implement, the combination with said implement of a plurality of tool carrying bars pivotally supported on the implement, earth working tools carried thereby, a shifting bar operatively connecting said bars for rotating the same in unison, a draft member connected with one of said tool carrying bars and with the tractor to rotate said bars to move said earth working tools from transport position to operating position, and toggle link mechanism connected with one of said tool carrying bars and with said shifting bar at a point spaced fore and aft of said one tool bar for locking said earth working tools in operating position.

7. In a tractor drawn implement, the combination with said implement, of a plurality of tool carrying bars pivotally supported on the implement, earth working tools carried thereby, a shifting bar pivotally connecting said bars for rotating the same in unison, one of said bars including a part extending above said shifting bar, a draft member connected with one of said tool carrying bars and with the tractor to rotate said bars to move said earth working tools from transport position to operating position, toggle link mechanism connected with the forward portion of said shifting bar and with the upwardly extended part of said one tool carrying bar for locking said earth working tools in operating position, and means operative from the tractor for breaking the toggle lock to permit rotation of said tool carrying bars for moving said earth working tools from operating position to transport position upon forward movement of the tractor.

8. In a tractor drawn implement, the combination with said implement, of a plurality of tool carrying bars pivotally supported on the implement, earth working tools carried thereby, a shifting bar operatively connecting said bars for rotating the same in unison, a draft member connected with one of said tool carrying bars and with the tractor to rotate said bars to move said earth working tools from transport position to operating position, means for automatically locking said earth working tools in operating position, said means comprising a pair of toggle links connected with said shifting bar and with one of said tool carrying bars, and means for preventing movement of said toggle links in one direction beyond a predetermined point.

9. In a tractor drawn implement comprising a frame, the combination of tool carrying bars rotatably mounted on said frame, earth working tools carried by said bars, a shifting bar operatively connecting said tool carrying bars for swinging said bars to move said earth working tools from operating position to transport position by forward movement of the implement, and means carried by one of said bars and movable into contact with said shifting bar for preventing movement of said bars beyond a predetermined point when the earth working tools are moved to transport position.

10. In a tractor drawn implement, a plurality of pivotally supported tool carrying bars, earth working tools carried thereby, a shifting bar operatively connecting said bars for rotating the same in unison, depth adjusting means for said tools, means for raising said earth working tools from operating position to transport position by forward movement of the tractor, and a stop member carried by one of said tool carrying bars and adapted to contact with said shifting bar for limiting the upward movement of said tools in the raising operation.

11. In a tractor drawn implement comprising a frame, the combination of a plurality of tooth carrying bars rotatably mounted on said frame, earth working teeth carried by said bars, a shifting bar operatively connecting said tooth carrying bars, a draft member connected with said shifting bar and with the tractor and operative upon backing of the tractor to move said shifting bar to rotate said earth working teeth from transport position to operating position, toggle link mechanism connected with said shifting bar and with one of said tooth carrying bars for locking said earth working tools in operating position, and means carried by one of said tooth carrying bars and said toggle link mechanism for regulating the depth adjustment of said earth working teeth when they are moved to operating position.

12. In a tractor drawn implement, the combination of a frame, a plurality of tool carrying bars pivotally supported on said frame, earth working tools carried thereby, a shifting bar operatively connecting said bars for rotating the same in unison, a draft member connected with one of said tool carrying bars and adapted to be connected with the tractor to rotate said bars to move said earth working tools from transport position to operating position, and means for automatically locking said earth working tools in operating position, said means comprising a pair of toggle links connected with said shifting bar and with one of said tool carrying bars and a lever pivotally mounted on one of said toggle links and cooperating with both of said toggle links for preventing movement of said toggle links in one direction beyond a predetermined point.

13. In a tractor drawn implement, the combination of movably mounted earth working tools, means controlled by the backing of the tractor for moving said earth working tools from transport position to operating position, means for automatically locking said earth working tools in operating position, said means comprising a pair of toggle links, and a lever pivotally mounted on one of said toggle links and adapted when in one position to prevent movement of said toggle links in one direction beyond a predetermined point and when moved into another position to break said toggle lock.

14. In a tractor drawn implement, the combination of a plurality of pivotally supported tool carrying bars, earth working tools carried thereby, a shifting bar operatively connecting said bars for rotating the same in unison, a draft member connected with one of said tool carrying bars and with the tractor to rotate said bars to move said earth working tools from transport position to operating position, and toggle mechanism connected with said shifting bar and with one of said tool carrying bars for locking said earth working tools in operating position, said toggle mechanism including a pair of links and a lever pivotally mounted on one of said toggle links and operative in one position to prevent movement of said toggle links in one direction beyond a predetermined point when said toggle links are in locked position, said lever being operative from the tractor for breaking the toggle lock to permit rotation of said tool carrying bars for moving said earth working tools from operating position to transport position upon forward movement of the tractor.

15. In a tractor drawn implement, the combination of a plurality of pivotally supported tool carrying bars, earth working tools carried thereby, a shifting bar operatively connecting said tool carrying bars for rotating the same in unison, a draft member connected with one of said tool carrying bars and with the tractor to rotate said bars to move said earth working tools from transport position to operating position, toggle link mechanism connected with said shifting bar and with one of said tool carrying bars for locking said earth working tools in operating position, an offset arm on one of said toggle links, and a lever pivotally connected to said offset arm and operative from the tractor for breaking the toggle lock.

16. In a tractor drawn implement, the combination of a plurality of pivotally supported tool carrying bars, earth working tools carried thereby, a shifting bar operatively connecting said tool carrying bars for rotating the same in unison, a draft member connected with one of said tool carrying bars and with the tractor to rotate said bars to move said earth working tools from transport position to operating position, toggle link mechanism connected with said shifting bar and with one of said tool carrying bars for locking said earth working tools in operating position, an offset arm on one of said toggle links, a lever pivotally connected to said offset arm and operative from the tractor for breaking the toggle lock, and a stop carried by said lever and adapted to contact with said offset arm for limiting the movement of the lever upon breaking of the toggle lock.

17. A harrow comprising a frame including side members, transverse tool bars having vertically disposed end portions pivotally connected with said side members, earth working tools carried by said bars, means connecting said bars to cause them to swing together to and from operating position, and draft means supported on said side members and connected to both vertically disposed end portions of the forward transverse bar.

18. A harrow comprising a plurality of harrow sections, each section comprising a frame including side members, transverse tool bars having vertically disposed end portions pivotally connected with said side members, earth working tools carried by said bars, means connecting said bars to cause them to swing together to and from operating position, and a pair of draft links, one slidably supported on each of said side frame members and connected with the associated vertically disposed end portion of the forward transverse tool bar, and draft means connected with the draft links of each of said sections.

19. In an agricultural implement, the combination of a plurality of pivoted tool carrying bars, earth working tools carried thereby, a shifting bar operatively connecting said tool carrying bars for rotating said bars in unison, a draft member supported on the forward portion of the implement and controlled by the backing of the implement for lowering said earth working tools from transport position to operating position, and means acting at both ends against said shifting bar for automatically locking said earth working tools in the latter position.

20. In a tractor drawn implement, the combination of movably mounted earth working tools, means controlled by the backing of the tractor for moving said earth working tools from transport position to operating position, means for automatically locking said earth working tools in operating position, said means comprising a pair of toggle links, and a lever pivotally mounted on one of said toggle links and movable into one position to react against both of said toggle links to prevent movement thereof in one direction beyond a predetermined point and when moved into another position to break said toggle lock.

21. A harrow comprising in combination, two substantially U-shaped frame sections, transverse tool bars pivotally connected with said frame sections, earth working tools carried by said bars, means connecting said bars to cause them to swing together to and from operating position, and a pair of draft members for each of said sections operative to swing said bars to move said tools to and from operating position, said draft members being positioned in substantially fore and aft alinement with the side members of said frame sections, whereby sidewise movement of said sections relative to each other is substantially eliminated at all times.

22. A harrow comprising, in combination, two fore and aft extending frame sections, transverse tool bars pivotally connected with said frame sections, earth working tools carried by said bars, means connecting said bars to cause them to swing together to and from operating position, and a pair of draft members for each of said sections operative to swing said bars to move said tools to and from operating position, said draft members being positioned in substantially fore and aft alinement with the side members of said frame sections, whereby sidewise movement of said sections relative to each other is substantially eliminated at all times.

SHELDON S. SPIRE.